(12) United States Patent
Boye Hansen et al.

(10) Patent No.: US 10,633,790 B2
(45) Date of Patent: Apr. 28, 2020

(54) MOORING MEMBER

(71) Applicant: Calorflex AS, Larvik (NO)

(72) Inventors: Allan Boye Hansen, Sandefjord (NO); Peter Sörensen, Larvik (NO)

(73) Assignee: Calorflex, AS, Larvik (NO)

( * ) Notice: Subject to any disclaimer, the term of this patent is extended or adjusted under 35 U.S.C. 154(b) by 118 days.

(21) Appl. No.: 15/543,478

(22) PCT Filed: Jan. 14, 2016

(86) PCT No.: PCT/NO2016/050003
§ 371 (c)(1),
(2) Date: Jul. 13, 2017

(87) PCT Pub. No.: WO2016/114671
PCT Pub. Date: Jul. 21, 2016

(65) Prior Publication Data
US 2018/0327968 A1      Nov. 15, 2018

(30) Foreign Application Priority Data

Jan. 15, 2015   (NO) .................................. 20150074

(51) Int. Cl.
*D07B 1/04*       (2006.01)
*D07B 1/20*       (2006.01)
(Continued)

(52) U.S. Cl.
CPC ................. *D07B 1/04* (2013.01); *D07B 1/02* (2013.01); *D07B 1/14* (2013.01); *D07B 1/20* (2013.01);
(Continued)

(58) Field of Classification Search
CPC ...... B63B 2021/203; D07B 2201/2075; D07B 2201/2077; D07B 2201/2078;
(Continued)

(56) References Cited

U.S. PATENT DOCUMENTS 3,234,722 A  *  2/1966  Gilmore ............... D07B 1/0693
                                                          174/128.1
3,405,516 A     10/1968  Laureti
(Continued)

FOREIGN PATENT DOCUMENTS

GB          2003523 A     3/1979
GB          2053303 A     2/1981
(Continued)

OTHER PUBLICATIONS

"Norwegens Groesste Haengebruecke Fertiggestellt", Stahlbau, Ernst & Sohn; Berlin, DE, vol. 48, Jul. 1, 1979, pp. 221-222.
(Continued)

*Primary Examiner* — Ajay Vasudeva
(74) *Attorney, Agent, or Firm* — Arent Fox, LLP (57) ABSTRACT

A mooring member comprises a rope configured for extending between a vessel floating in a body of water and an anchoring device. The mooring member comprises a plurality of functional elements, wherein a first functional element is wound onto at least a portion of the rope, a second functional element is wound onto the first functional element, and so on, until an outermost functional element is wound onto a second-to-outermost functional element. The functional elements are wound in a helical configuration, and are configured to provide at least one of the following functions: damage protection, buoyancy, optical detection, sonar detection, stiffness control, and anti-fouling.

14 Claims, 6 Drawing Sheets

(51) Int. Cl.
*D07B 1/02* (2006.01)
*D07B 1/14* (2006.01)
*B63B 21/20* (2006.01)
*D07B 1/08* (2006.01)
*F16G 11/14* (2006.01)

(52) U.S. Cl.
CPC ...... *F16G 11/146* (2013.01); *B63B 2021/203* (2013.01); *D07B 1/08* (2013.01); *D07B 2201/1004* (2013.01); *D07B 2201/1024* (2013.01); *D07B 2201/2003* (2013.01); *D07B 2201/2088* (2013.01); *D07B 2201/2089* (2013.01); *D07B 2401/205* (2013.01); *D07B 2401/2075* (2013.01); *D07B 2501/2061* (2013.01)

(58) Field of Classification Search
CPC .... D07B 2201/2083; D07B 2201/2088; D07B 2201/2089; D07B 2201/2091; D07B 2205/2003; D07B 2401/202; D07B 2401/2025; D07B 2401/2065; D07B 2401/401; D07B 2501/2061; D07B 1/02; D07B 1/04; D07B 1/20
USPC .......................................................... 57/230
See application file for complete search history.

(56) References Cited

U.S. PATENT DOCUMENTS

| | | | | |
|---|---|---|---|---|
| 4,426,230 A * | 1/1984 | Davis | ...................... | H01B 7/285 106/245 |
| 4,550,559 A * | 11/1985 | Thomson | ................ | B29C 48/30 57/223 |
| 4,640,212 A * | 2/1987 | Brandt | .................... | B63B 21/20 114/230.2 |
| 5,018,775 A | 5/1991 | McKenna et al. | | |
| 5,218,016 A | 6/1993 | Jarrin et al. | | |
| 5,834,942 A * | 11/1998 | De Angelis | ............ | D07B 1/025 324/522 |
| 6,099,961 A * | 8/2000 | Del Vecchio | ........... | B63B 21/50 427/117 |
| 8,109,071 B2 * | 2/2012 | Gilmore | .................... | D07B 1/14 57/211 |
| 2009/0078922 A1 | 3/2009 | Kempf et al. | | |
| 2011/0089130 A1 * | 4/2011 | Stephan | .................... | B66C 1/12 212/262 |
| 2012/0297746 A1 * | 11/2012 | Chou | ...................... | D07B 1/02 57/230 |
| 2013/0247534 A1 | 9/2013 | Canedo Duarte Da Rocha et al. | | |
| 2013/0247536 A1 | 9/2013 | Erlendsson et al. | | |
| 2018/0216291 A1 * | 8/2018 | Baldinger | ................ | D07B 1/02 |

FOREIGN PATENT DOCUMENTS

| | | |
|---|---|---|
| JP | H10168772 A | 6/1998 |
| WO | WO 97/09481 A1 | 3/1997 |
| WO | WO 98/50621 A1 | 11/1998 |
| WO | WO 2011/102730 A1 | 8/2011 |
| WO | WO 2012/162556 A1 | 11/2012 |
| WO | WO 2013/163094 A1 | 10/2013 |

OTHER PUBLICATIONS

International Search Report issued in International Application No. PCT/NO201605003 dated Apr. 12, 2016.
Norwegian Search Report issued in Norwegian Application No. 20150074 dated Aug. 5, 2015.
Norwegian Search Report issued in Norwegian Application No. 20150074 dated Sep. 18, 2015.

* cited by examiner

MOORING MEMBER

CROSS REFERENCE TO RELATED APPLICATION

This application is a 35 U.S.C. 371 National Phase of PCT Application No. PCT/NO2016/050003 filed Jan. 14, 2016, which claims priority to Norwegian (NO) Application No. 20150074 filed Jan. 15, 2015. The disclosure of these prior applications are hereby incorporated by reference herein.

FIELD OF THE INVENTION

The invention concerns the field tension members, particularly ropes and cables that are used for mooring offshore marine floating vessels, as specified in the preamble of claim 1. The invention is particularly useful with synthetic fibre ropes.

BACKGROUND OF THE INVENTION

Offshore exploration and production of hydrocarbon resources has for many years been performed from floating marine vessels, such as so-called SPARs, semi-submersible platforms, and purpose-built ships, in general classified as FPS or FPSOs for permanent installations. An important aspect in offshore drilling operations is the use of mobile drilling units, typically referred to as MODUs. Traditionally, all such vessels have been moored by steel chains and/or steel ropes, extending between the vessel and seabed anchors for safe station-keeping. As operations over the years have been shifted into deeper waters and thus requiring longer mooring chains, the weight of these mooring chains has become a major design parameter that the operators seek to reduce. The use of synthetic fibre ropes has therefore become more prevalent, in order to reduce overall weight, reduce fatigue characteristics and eliminate corrosion typically associated with metal-based mooring lines.

Synthetic fibre ropes for offshore mooring purposes normally comprise a core (which typically is made up of a number of polyester strands and bundles) enclosed by a braided jacket. Materials commonly used in making synthetic fibre ropes are Polyester, Aramid, and ultra high-molecular weight polyethylene (UHMWPE), and in limited cases nylon. Most synthetic fibre ropes used as mooring lines range from slightly positive to slightly negative buoyancy.

Although a synthetic fibre rope is an attractive alternative to a conventional steel mooring chain due to its low weight, it also has certain disadvantages, for example susceptibility to mechanical damage induced by handling, sharp objects and abrasion.

During installation (i.e. connection between seabed anchor and floating vessel), portions of the synthetic fibre rope are in direct contact with anchor handling vessel (AHV) decks, and often dropped onto, and/or dragged along, the seabed, whereby it might be damaged by gravel, rocks, or other sharp objects (decks, sharp steel edges, etc.).

During operation (i.e. when the fibre ropes have been installed), the lower portion of the mooring line is touching and rubbing against the seabed. Therefore, a traditional fibre rope may have limited use in this lower portion of the mooring line, and a conventional mooring chain is used instead—connecting to the fibre rope at a safe distance above the seabed.

The installed fibre rope is also exposed to objects that are dropped into or dragged through the water, which may easily cut into and damage the rope. A major threat to fibre ropes is trawl wires from either pelagic trawling or on-bottom trawling. Trawlers may regularly fish in the vicinity of either permanent or MODU installations, an activity that substantially increases the risk of damage to installed mooring lines. If a steel wire dragged across a fibre rope, the forces may be of such magnitude that the wire virtually saws through, and cuts, the fibre rope.

The prior art includes WO 2011/102730 A1, which describes an anchor spread for mooring a marine vessel, having a seabed anchor chain connected to a fibre rope. The fibre rope is prepared by being packed to a bundle or coil arranged in a protective container on the seabed. The fibre rope is pulled out of the container at a predetermined pulling force, and picked up and connected to the anchor winch chain.

The prior art also includes WO 98/50621 A1, which describes a synthetic cable used for the anchoring of floating platforms in offshore oil production. A layer to protect the cable core against ingress of particles comprises a strip of polymer material placed in helical fashion between the core and the cable's outer braided protective layer. The helical layer permits passage of water but prevents the passage of particles towards the core.

The prior art also includes WO 2013/148711 A1 (also published as US 2013/0247534 A1), which describes a rope having a cut-resistant jacket which includes a core comprised of a plurality of sub-ropes. The sub-ropes are made of fibres of a synthetic material, such as polyester, nylon, polypropylene, polyethylene, aramids, or acrylics. A cut-resistant jacket surrounds the core and is made from a material that has increased strength and/or abrasion resistance over the material of the core. The cut-resistant jacket may comprise steel wires and may further comprise braided steel wires or rope. The braided steel wires or rope may be covered with a plastic material for increased corrosion resistance. A filter layer, for preventing particles larger than a certain size from entering the core, may be disposed between the core and the cut-resistant jacket and may be wrapped around an outer surface of the core prior to the cut-resistant jacket being formed.

The prior art also includes WO 97/09481, which describes a buoyant rope assembly having a central rope, e.g. of nylon, a plurality of flotation elements of closed cell foam, e.g. of polyethylene, buffer elements of open cell foam, e.g. of polyurethane, arranged between and flush with the flotation elements, and a protective outer layer, e.g. of polyurethane.

It is therefore a need to improve the durability and reduce the vulnerability of fibre ropes used as mooring lines.

SUMMARY OF THE INVENTION

The invention is set forth and characterized in the main claim, while the dependent claims describe other characteristics of the invention.

It is thus provided a mooring member, comprising a rope configured for extending between a vessel floating in a body of water and an anchoring device, characterized a plurality of functional elements, wherein a first functional element is wound onto at least a portion of the rope, a second functional element is wound onto the first functional element, and so on, until the outermost functional element is wound onto the second-to-outermost functional element; all said functional elements being wound in a helical configuration; said functional elements comprising one or more of the means in the group comprising: damage protection means, buoyancy means, optical detection means, sonar detection means, stiffness control means, anti-fouling means.

In one embodiment, the damage protection means comprises an abrasion and cut-resistant material.

In one embodiment, a functional element comprises a plurality of embedded hollow spheres.

In one embodiment, the optical detection means comprise a coloured material. In one embodiment, a functional element comprises a hydrophilic material. In one embodiment, a functional element comprises a hydrophobic material.

In one embodiment, the plurality of functional elements are applied on the rope in layers, one on top of the other.

In one embodiment, the functional elements are extruded or pultruded elongate elements, having a base material comprising a thermoplastic.

In one embodiment, at least one of the functional elements comprises gripping members for releasable engagement with at least a portion of the rope.

In one embodiment, the mooring member comprises an end termination device, having a connection eye and a thimble; said thimble being configured for connection to a loop portion of the mooring member. The thimble may comprise a plurality of guide grooves; each configured for receiving at least a portion of an individual core strand or sub-rope.

Functional elements with different properties may be used along the length of the mooring member, in order to obtain the desired effects (e.g. abrasion resistance, buoyancy, stiffness) at the appropriate locations.

The invented functional elements provide improved mechanical and optical properties for the mooring member.

As a trawl wire of a certain length gets pulled over a mooring line at a certain speed and with a certain contact force and angle, friction in the system creates large amount of mechanical work and energy. The total created energy in such a situation can be divided in two phenomena:
1. Abrasive forces that wear the functional elements away from the mooring line, potentially resulting in the trawl wire cutting the fibre rope.
2. Heat generated from the work created by friction, potentially melting the functional elements, the underlying fibre jacket and the core strands and/or sub-ropes.

The invented functional elements absorb, withstand and dissipate this total energy to the surrounding seawater environment and in turn protect or delay critical damage to the mooring line.

BRIEF DESCRIPTION OF THE DRAWINGS

These and other characteristics of the invention will become clear from the following description of a preferential form of embodiment, given as a non-restrictive example, with reference to the attached schematic drawings, wherein.

DETAILED DESCRIPTION OF A PREFERENTIAL EMBODIMENT

The following description will use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Figure 1:
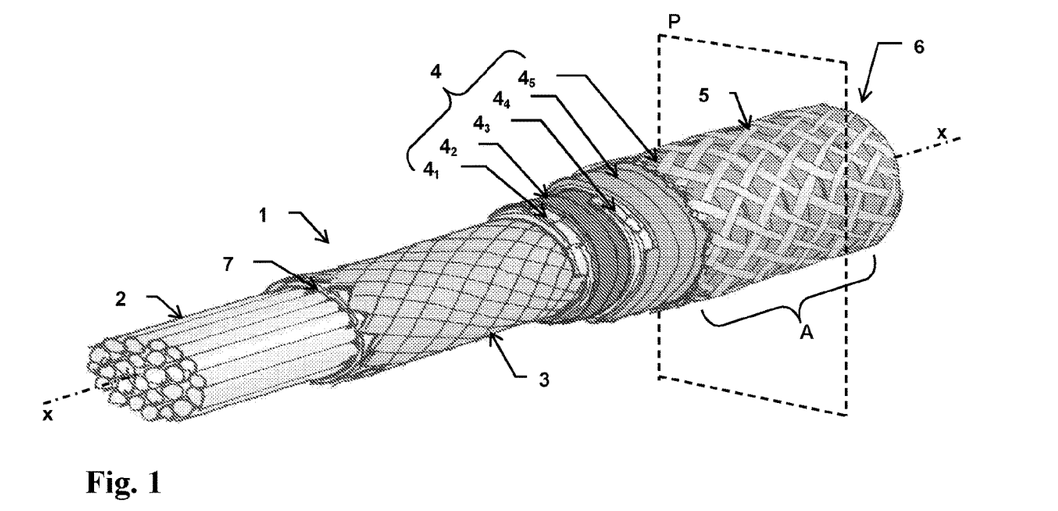
FIG. 1 is a perspective view of a portion of a synthetic fibre rope furnished with a number of the functional elements according to the invention, shown as individual tapes wrapped in a helical fashion around the rope and secured with an outer fastener in the form of a braided structure.
Figure 2:
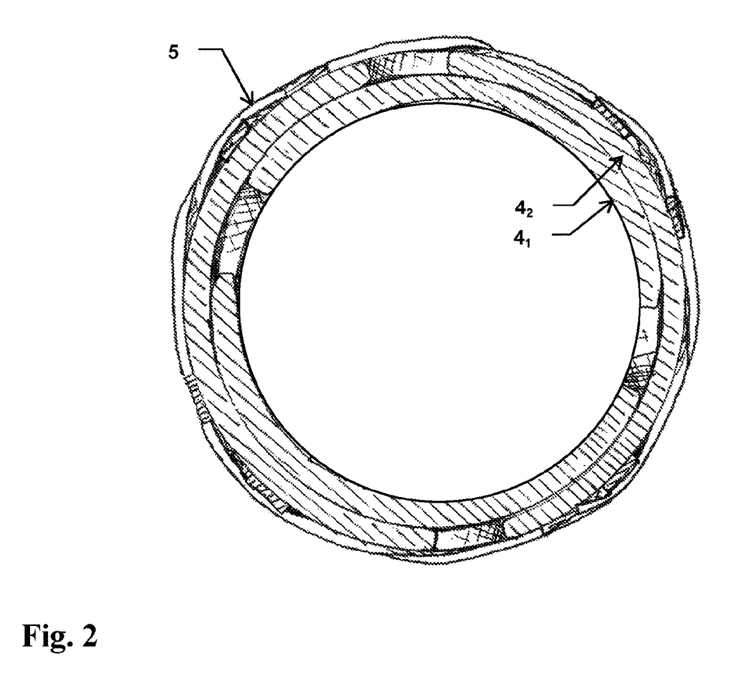
FIG. 2 is a cross-sectional drawing of an embodiment of the invention, corresponding to the plane P in FIG. 1, but the rope has been removed and only two layers of functional elements are shown (for clarity of illustration)

FIG. 1 shows a portion of an embodiment of the mooring line 6, hereinafter also referred to as a mooring member 6. A synthetic fibre rope 1 comprises in the illustrated embodiment a bundle of core strands 2 surrounded by a braided jacket 3. A membrane 7 is arranged between the jacket 3 and the bundle of core strands 2. This membrane prevents ingress of particles that could damage the core strands. A fibre rope of this type is well known in the art, and is commonly used as mooring lines. The rope strands may for example be made of synthetic polyester, polyethylene or polyamide. Other fibre types are conceivable. For mooring purposes, the rope 1 outer diameter (i.e. including the jacket 3) may range between 80 mm and 300 mm. The invention shall, however, not be limited to such dimensions.

Although the invention in the following is described with respect to a fibre rope made up of a bundle of core strands 2, it should be understood that the invention is equally applicable for a rope comprising a number of sub-ropes. Therefore, reference number 2, in the figures and the following description, may refer to rope strands or to sub-ropes.

Arranged around the rope 1 are a number of so-called functional elements 4, in the illustrated embodiment wound around the rope in a helical manner (i.e. describing a helix). FIG. 1 shows a rope carrying five functional elements, labelled $4_1$ to $4_5$, one layered on top of the other. The innermost layer $4_1$ bears against the rope jacket 3, the next layer $4_2$ bears against the innermost layer $4_1$, and so on, until the outermost layer $4_5$ which is exposed to the surroundings.

Figure 12:
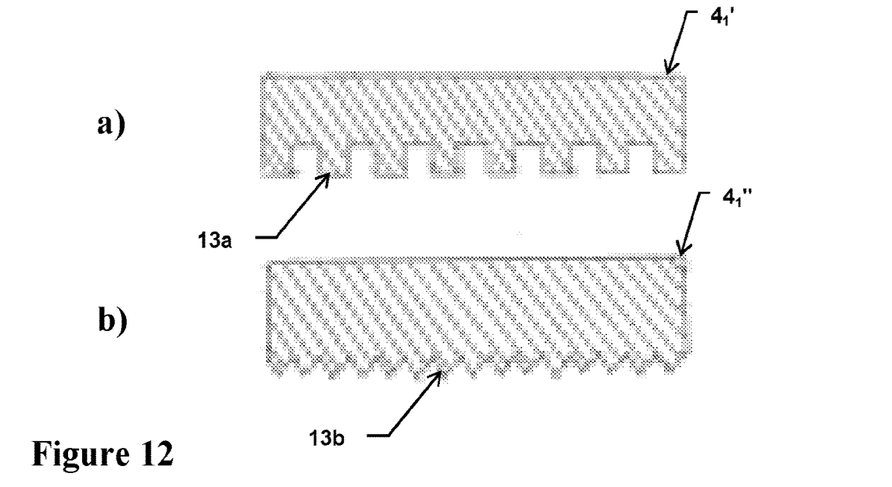
FIG. 12 shows (in cross-section) two different embodiments of gripping elements.

The outermost layer $4_5$ is held in place (i.e. fastened to the layer(s) below) by an outer braided structure 5. It should be understood that this braided structure 5 may be substituted by any other suitable holding or locking means. The innermost layer $4_1$ preferably comprises serrations 13a (see FIG. 12a) or castellations 13b (see FIG. 12b) that serve as gripping members into the rope jacket 3. The functional elements are thus connected to the rope, but are also capable of moving with respect to the rope (due to e.g. rope bending). Other, equivalent, gripping means may be used. The layers of functional elements thus form a compound structure, which allows water to circulate through the layers and into the rope. The functional elements' helical configuration accommodates axial movement, e.g. elongation, of the rope.

Figure 5:
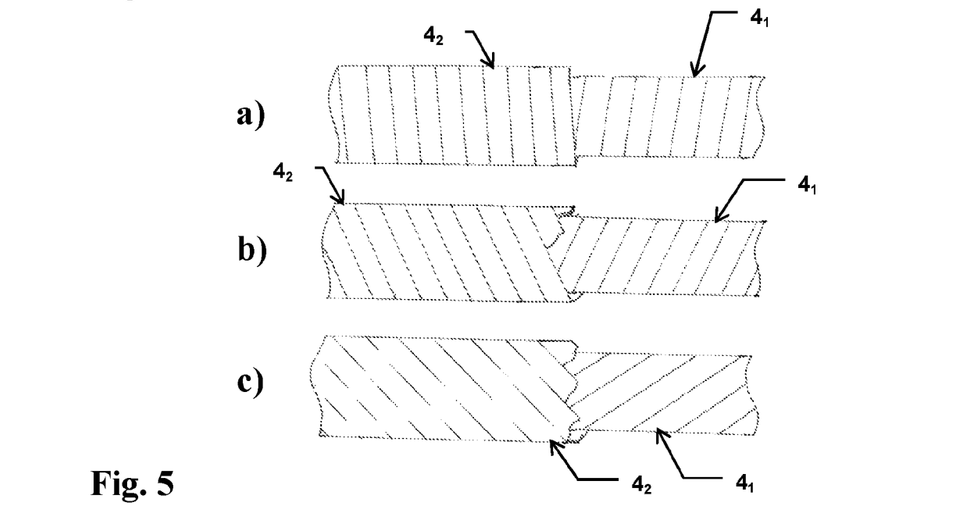
FIG. 5 shows the functional elements' placement on the rope in different orientations and helical angles.

In the illustrated embodiment, each functional element $4_1$-$4_5$ comprises an elongated, tape-shaped, member, and each tape-shaped member is wound around the rope in a helical manner. The functional elements may therefore in the following also be referred to as "tapes". As is clearly shown in FIGS. 5a-c, the pitch angle and respective orientation of each of the functional elements may be varied according to specific requirements. For example, as shown in FIGS. 5a-c, the windings of adjacent elements $4_1$, $4_2$ may be in opposite directions. The various elements may also have different thicknesses and widths.

The functional elements (tapes) are typically manufactured by extrusion or/and pultrusion, and their base material typically comprise a thermoplastic, from the semi-crystalline families such as polyamides, polyolefins, fluoroplastics or more amorphous thermoplastics (such as polystyrene), or combinations of these.

Figure 7:
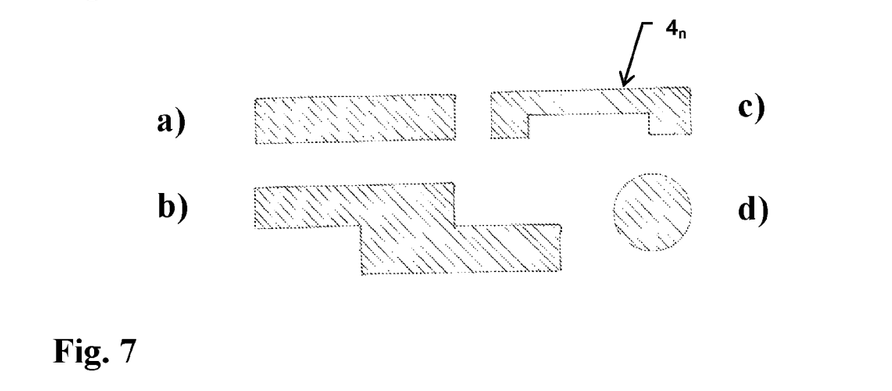
FIG. 7 shows (in cross-section) four different embodiments of the functional elements.

Examples of possible tape cross-sections are shown in FIG. 7: a) rectangular; b) stepped; c) notched; d) circular. The invention is, however, not limited to these cross-sections.

Figure 8:
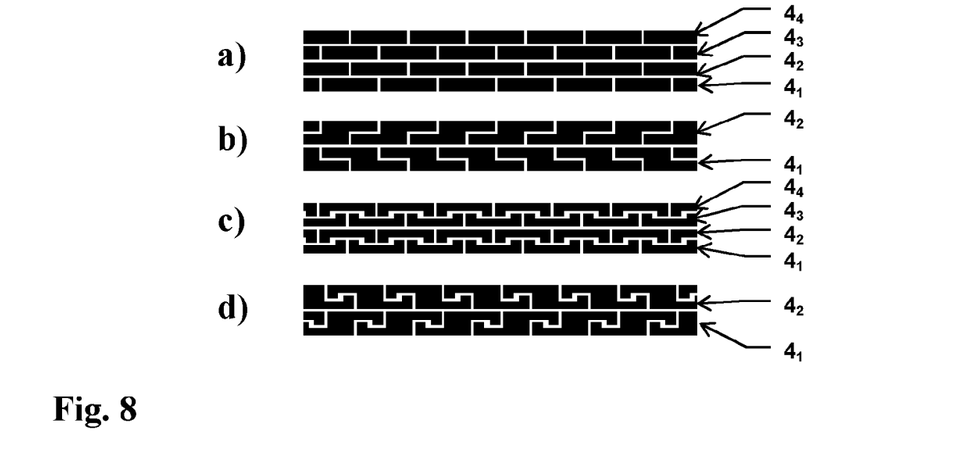
FIG. 8 shows (in cross-section) different variants of layers of functional elements (of different cross-sectional shapes)

FIG. 8 illustrates (schematically) how different cross-sectioned tapes may be arranged in layers when applied onto a fibre rope (not shown in FIG. 8): a) rectangular cross-section—staggered; b) stepped cross-section—inverted and staggered; c) notched cross-section—inverted and staggered; d) notched cross-section—inverted.

Figure 3:
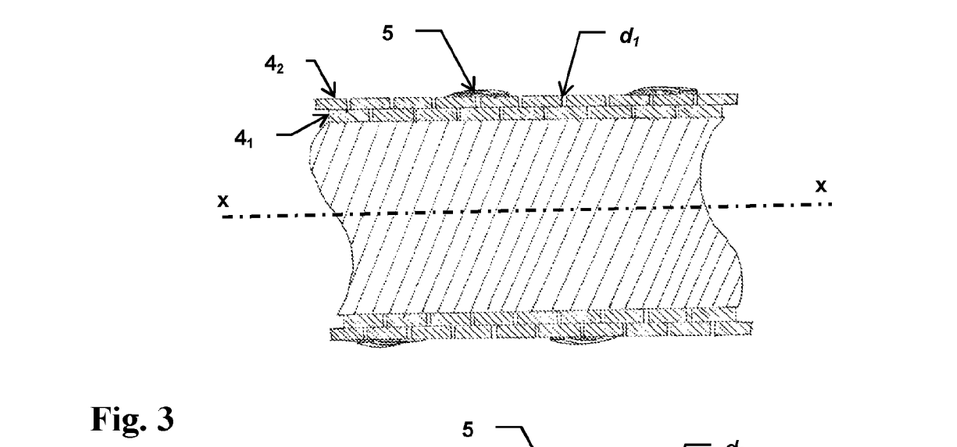
FIG. 3 is an axial section (along longitudinal axis x in FIG. 1), corresponding to the portion A in FIG. 1, but showing only two layers of functional elements (for clarity of illustration)
Figure 4:
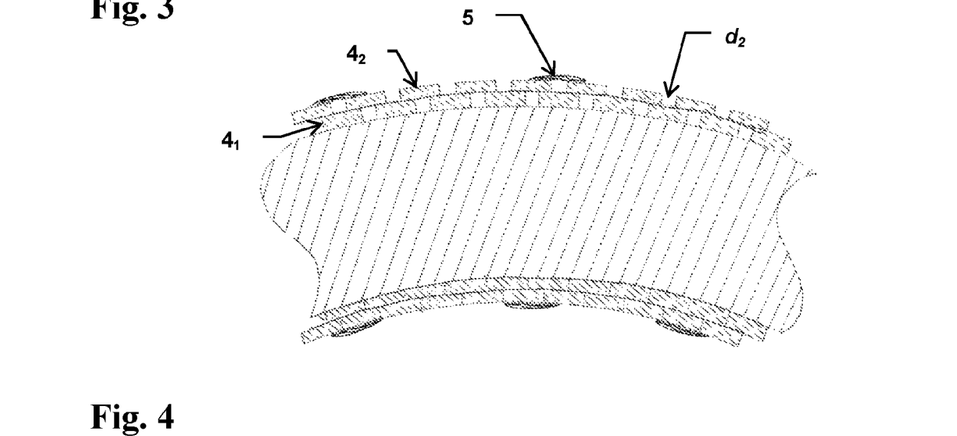
FIG. 4 corresponds to FIG. 3 but shows the displacement of the functional elements when the rope is bent.

FIG. 3 shows how two layers $4_1$, $4_2$ of functional elements are staggered, and FIG. 4 shows how the functional elements are displaced when the rope (not shown in FIG. 4) is bent. The functional elements are wound (helically) onto the fibre rope, with a distance (gap) $d_1$ between the windings, in order to avoid axial compression between each winding and to allow for a certain bending radius. When the rope is bent (FIG. 4), the distance between the windings on the outer radius increases (to $d_2$), whereas the windings on the inner radius are moving towards each other (i.e., gap reduction, towards abutment).

The functional elements may be designed and manufactured with one or more specific function, suitable for the fibre rope's operational requirements (e.g. mooring). Such specific functions may comprise, but not necessarily be limited to:

Wear resistance—for protection against: cuts (e.g. by trawl wire), abrasion (e.g. against seabed), and damages by dropped objects.
Toughness and other mechanical properties.
High PV tolerance (where the P describes the contact pressure between the abrading object and the functional element and where the V describes the velocity between the abrading object the functional element).
Buoyancy—for controlling buoyancy, e.g. at specific portions along the mooring line, for example to reduce catenary.
Visual (optical) detection and damage reporting.
Sonar detection.
Stiffness control.
Fouling prevention.

Figure 6:
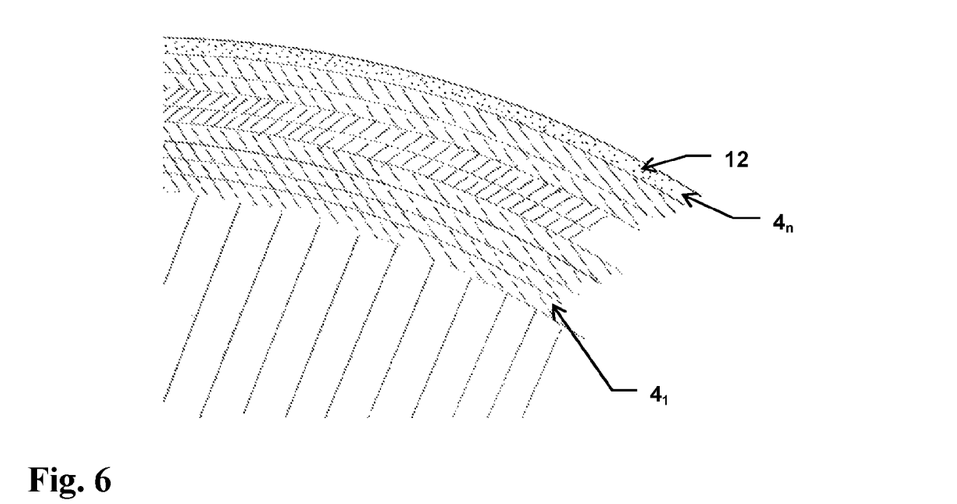
FIG. 6 is part of a cross-section of a number of functional elements, indicating how different functional elements have different properties and functions.

Thus, one or more of the functional elements may have a filler material, comprising a plurality of hollow or solid micro-spheres 12 (see FIG. 6), made of e.g. glass, ceramic spheres, nanoclay, talcum, calcium carbonate. The hollow spheres will contribute to reducing the density of the functional element and hence increase its buoyancy. Other filler materials will improve the functional element's cut resistance and abrasion resistance. Optical fibres or strain gages may be incorporated in the functional element to monitor the elongation of the mooring line. Filler materials may also comprise lubricating agents such as $MoS_2$ or PTFE, glass fibre, carbon fibre, aramid fibre, and/or basalt, or other amorphous or hydrophobic fillers in order to reduce seawater absorption. Filler materials may also comprise anti-fouling agents in order to prevent algae, mussels and barnacles growth (which would add submerged weight).

Filler materials of different colours may be incorporated in different functional elements, thus making one functional element optically discernible from another. This is illustrated in FIG. 1, where the five different functional elements have different colours. This feature provides for an optional detection and assessment (e.g. via a ROV-controlled camera) of cuts and other damages. The different colours will indicate penetration depth of the cut and the magnitude of the damage.

Figure 10:
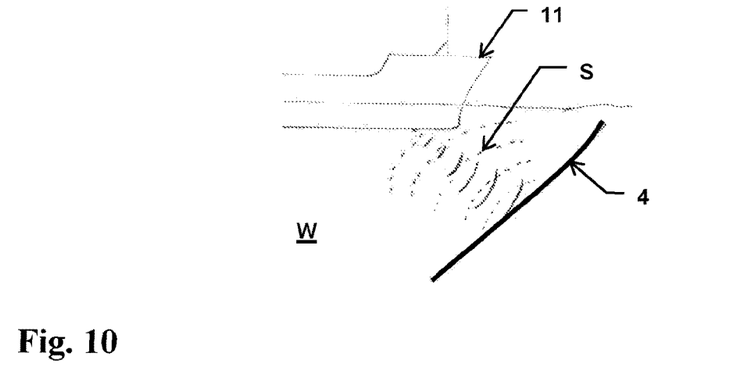
FIG. 10 is a sketch indicating one application of the invention.

The hollow spheres 12 are detectable by sonar signals S, in a manner which per se is well known. Therefore, a mooring line 6 in which one (e.g. the outermost) functional element comprises spheres 12 (FIG. 6) will be have a potential for being detected by the fishing vessels' on-board sonar (e.g. echo-sounder, used as fish-finder), and trawl wire impact may be avoided. FIG. 10 illustrated this situation.

In one embodiment, one or more of the functional elements incorporates a filler material which exhibits swelling properties when in contact with water. When a mooring member having such functional element is installed and brought in contact with the seawater, that functional element (which is wrapped around the fibre rope as described above) will swell and effectively increase the stiffness of the mooring member following installation.

Figure 9A:
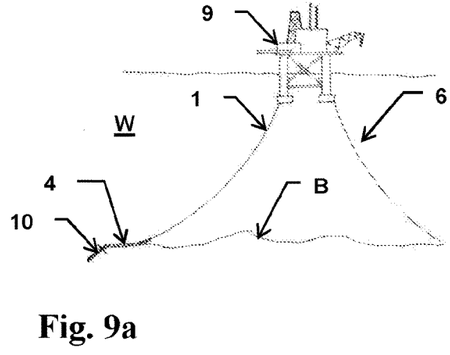
FIGS. 9a and 9b show the invention applied on the mooring lines of a floating platform.
Figure 9B:
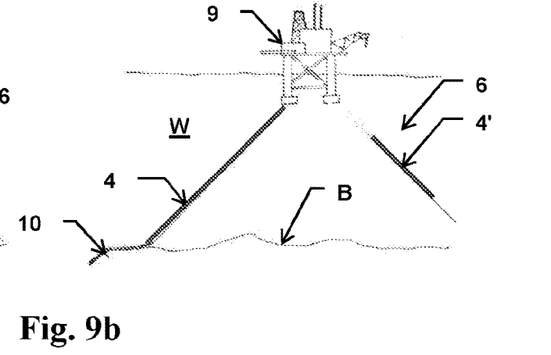

The functional elements may be used on the entire mooring line 6, or on parts of it. Also, functional elements with different properties may be used on different parts of the mooring line 6. For example, functional elements having particular abrasion- and cut resistant properties may be used on the portion of the mooring line 6 that is connected to the seabed and in contact with the seabed (see FIG. 9a). Functional elements having buoyant properties or/and swelling properties, as described above), may be applied to the mooring line to reduce or eliminate catenary and improve stiffness. FIG. 9b shows two possible configurations.

Figure 11:
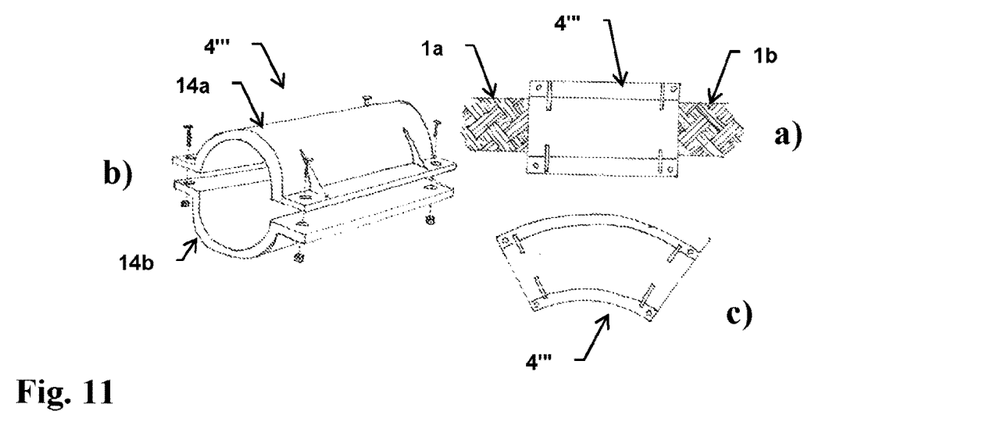
FIG. 11 is shows various embodiments of the functional elements, used for protecting connections between ropes.

FIG. 11 illustrates an embodiment of the functional elements. When two ropes 1a, 1b, are joined, for example conventional spliced eyes connected by shackles (or H-links), functional elements in the form of a casing 4''' protect the joint (see FIG. 11a). The casing may comprise casing halves 14a,b, joined by bolts (FIG. 11b) or clamps. Other is fastening means, such as seizing, may be used.

The casing 4''' may comprise any one of the materials and properties mentioned in the relation to the functional elements described above, and may be manufactured to different shapes (FIG. 11c).

Figure 13:
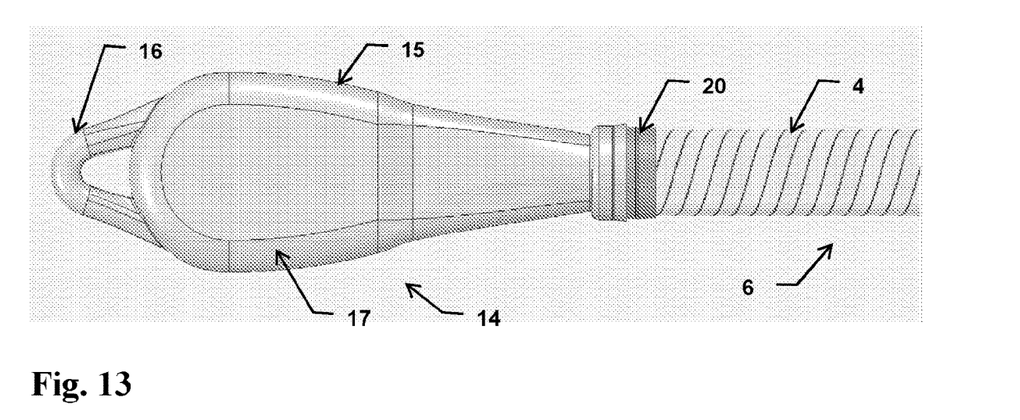
FIG. 13 is a plan view of an embodiment of an end portion of the mooring member having an end termination device.
Figure 14:
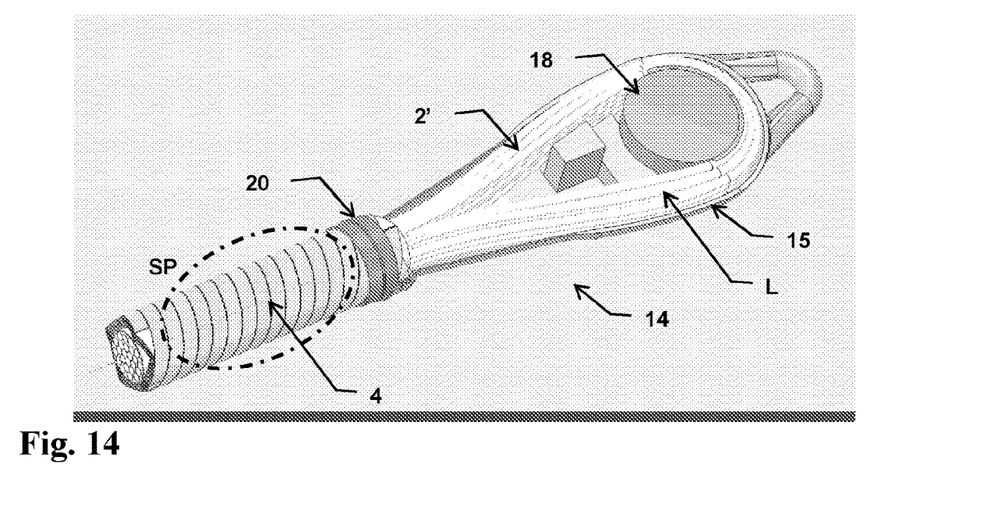
FIG. 14 is a perspective view of the end termination device shown in FIG. 13, in a partly disassembled state.
Figure 15:
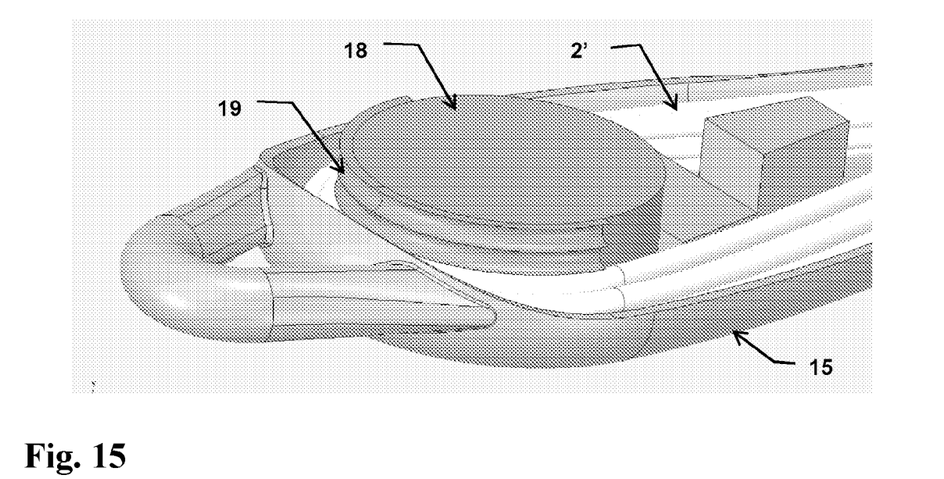
FIG. 15 is a perspective view of a portion of the disassembled end termination device, in which a few sub-ropes have been removed in order to display guide grooves on the thimble.

FIG. 13 shows an end portion of the mooring line 6, clad with one or more of the functional elements 4, and connected to an end termination device 14. The end termination device 14 comprises a housing 15, a connection eye 16 (for a shackle, etc.), and a removable cover 17. Crimp rings 20 are used to secure the ends of the functional elements 4, near the housing. In FIG. 14, the cover has been removed, showing how the sub-ropes (alternatively core strands) 2' are looped around a thimble 18 (connected to the housing) and spliced in a region SP (splice not shown, covered by the functional elements 4). The housing 15 and the thimble 18 are made of a high-strength material (e.g. stainless steel) suited for the application. In use, the mooring line may be cut to a desired length, a portion of the jacket removed to expose a required length of sub-ropes 2'. The sub-ropes 2' are curved in a loop L as shown in FIG. 14, and spliced onto themselves (in a manner known in the art. As shown in FIG. 15, the thimble 18 comprises guide grooves 19 for individual sub-ropes. During assembly, the loop L is placed around the thimble 18, the cover 17 is fitted onto the housing, and one or more functional element 4 are wrapped around the core strand, in a configuration shown in FIG. 13. The end termination device 14 thus protects the synthetic mooring line end termination against cuts, chafing and abrasion.

Although the invention has been described with reference to synthetic fibre ropes, it should be understood that the invention is also applicable on other types of ropes and mooring lines.

The fibre rope may for example be a polyester mooring line, with diameter and minimum breaking load ranging between approximately
 a) 110 mm and 380 tonnes, respectively, and
 b) 260 mm and 2000 tonnes, respectively.

The fibre rope may also for example be a Dyneema® mooring line, with diameter and minimum breaking load ranging between approximately
 a) 80 mm and 370 tonnes, respectively, and
 b) 190 mm and 2500 tonnes, respectively.

The invention has been described using the term "rope." It should be understood however, that in the context of this invention, the terms "hawser" and "cable" are considered to be equivalent terms to that of rope.

The invention claimed is:

1. A mooring member for extending between a vessel floating in a body of water and an anchoring device, comprising:
 a fibre rope; and
 a plurality of functional elements each wound as a different layer around at least a portion of the fibre rope, wherein one or more of the plurality of functional elements comprises a filler material comprising a plurality of hollow or solid micro-spheres, the plurality of functional elements further comprising:
  a first functional element at a first layer including a first filler material having a first colour,
  a second functional element at a second layer wound around the first layer wherein the second functional element includes a second filler material having a second colour different from the first colour,
 wherein all of the plurality of functional elements are wound in a helical configuration, are capable of moving with respect to the fibre rope, and are extruded elongated elements; and
 wherein the first colour and the second color provide an optically discernible indication of a depth of damage to the mooring member.

2. The mooring member of claim 1, wherein the plurality of functional elements include a base material comprising a thermoplastic.

3. The mooring member of claim 1, wherein one or more of the plurality of functional elements comprise a third filler material configured to improve an abrasion and cut resistance of the plurality of functional elements.

4. A mooring member for extending between a vessel floating in a body of water and an anchoring device, comprising:
 a fibre rope including a bundle of core strands extending along a first direction;
 a membrane enclosing the fibre rope; and
 a plurality of functional elements wound around the fibre rope and the membrane, comprising:
  a first functional element including a single or multiple strands that are wound in a helical configuration such that a first winding of the functional element and an adjacent second winding of the functional element have a gap therebetween;
  a second functional element wound in a helical configuration around the first functional element;
 wherein the plurality of functional elements are capable of moving with respect to the fibre rope;
 wherein the plurality of functional elements are extruded elongated elements; and
 wherein one or more of the plurality of functional elements comprises a filler material comprising a plurality of hollow or solid micro-spheres, or filler materials that improve the functional element's cut resistance and abrasion resistance.

5. The mooring member of claim 4, wherein one or more of the plurality of function elements comprise a filler material comprising a hydrophobic material.

6. The mooring member of claim 4, wherein one or more of the plurality of functional elements comprises a filler material comprising at least one lubricating agent configured to reduce seawater absorption.

7. The mooring member of claim 6, wherein the at least one lubricating agent comprises at least one of a $MoS_2$, PTFE, glass fibre, carbon fibre, aramid fibre, basalt, or other amorphous or hydrophobic filler.

8. The mooring member of claim 4, wherein one or more of the plurality of function elements comprise a filler material comprising one or more anti-fouling agents.

9. The mooring member of claim 4, wherein the gap between the windings is provided in order to avoid axial compression between each winding and to allow for a certain bending radius, whereby, when the fibre rope is bent, a distance between the windings on an outer radius increases, whereas the windings on an inner radius move towards each other and the gap is reduced.

10. The mooring member of claim 4, wherein at least one of the plurality of functional elements includes buoyant properties or/and swelling properties configured to reduce or eliminate catenary and improve stiffness of the mooring member.

11. The mooring member of claim 4, wherein at least one of the plurality of functional elements is designed and manufactured with at least one specific function suitable for the fibre rope's operational requirements, the at least one specific function comprising one or more of wear resistance, mechanical toughness, high PV tolerances where the P describes a contact pressure between an abrading object and a respective functional element and where the V describes a velocity between the abrading object and the respective functional element, buoyancy, visual detection and damage reporting, sonar detection, stiffness control, and fouling prevention.

12. The mooring member of claim 4, wherein the plurality of functional elements further comprises an outermost functional element that is fastened to one or more layers of the plurality of function elements below by a holding or locking mechanism.

13. The mooring member of claim 4, further comprising: an outer braided structure surrounding the plurality of functional elements.

14. A mooring member for extending between a vessel floating in a body of water and an anchoring device, comprising:
 a fibre rope; and
 a plurality of functional elements each wound as a different layer around at least a portion of the fibre rope comprising:
  a first functional element at a first layer including a first filler material having a first colour;
  a second functional element at a second layer wound around the first layer wherein the second functional element includes a second filler material having a second colour different from the first colour;
 wherein all of the plurality of functional elements are wound in a helical configuration, are capable of moving with respect to the fibre rope, and are extruded elongated elements; and
 wherein the first colour and the second color provide an optically discernible indication of a depth of damage to the mooring member, and wherein one or more of the plurality of functional elements comprise a filler material which exhibits swelling properties when in contact with water.

* * * * *